Feb. 19, 1957 C. GLINKA 2,782,104
APPARATUS FOR THE CONTINUOUS LIXIVATION, EXTRACTION
OR THE LIKE OF VEGETABLE MATTER
Filed May 7, 1954 3 Sheets-Sheet 1

INVENTOR:
Carl Glinka
BY:
Baldwin & Wight
ATTORNEYS

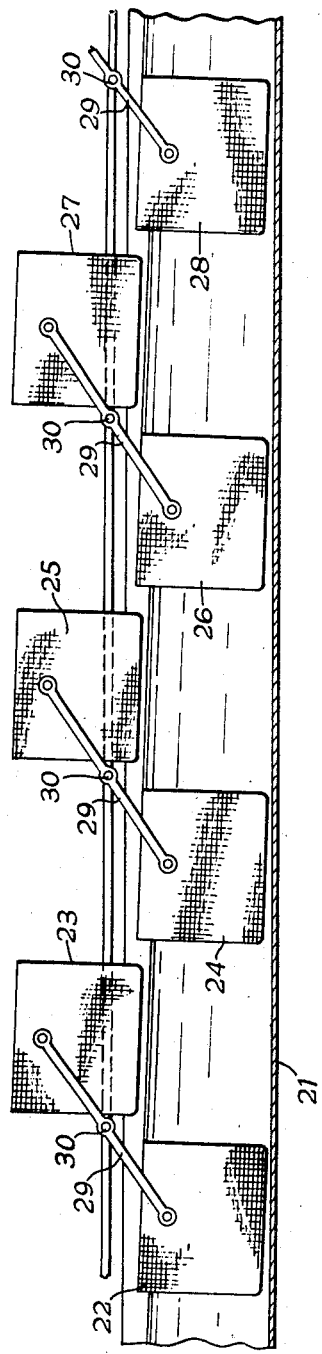

United States Patent Office 2,782,104
Patented Feb. 19, 1957

2,782,104

**APPARATUS FOR THE CONTINUOUS LIXIVA-
TION, EXTRACTION OR THE LIKE OF VEGE-
TABLE MATTER**

Carl Glinka, Krefeld-Uerdingen, Germany, assignor to
Buttner-Werke Aktiengesellschaft, Krefeld-Uerdingen,
Germany, a German corporate body Application May 7, 1954, Serial No. 428,341

Claims priority, application Germany May 11, 1953

5 Claims. (Cl. 23—270)

This invention relates to apparatus for the treatment of a solid material with a liquid. It has amongst its objects the provision of an improved process and apparatus for this purpose which is particularly suitable for the lixivation, extraction or like treatment of vegetable matter such as beet cossettes, oil seeds and the like.

In the specification of my prior patent application Serial No. 321,468, filed November 19, 1952, now Patent No. 2,764,474, a process is described in which the treatment liquid is caused to flow in a continuous, downwardly-flowing stream through the material and this stream is artificially made to follow a path of such length that it is caused to remain in contact with the material being treated for a sufficient period, the said material being conveyed in counterflow through the liquid in a direction opposite to the direction of flow of the latter. In a preferred process the treatment is carried out in a helically-arranged channel in which the material being treated, which is sub-divided into small batches, is conveyed in an upward direction, while the treatment liquid flows in a downward direction against the resistance provided by the batches of material.

Under given conditions it is possible, with the above process, to reduce the rate of flow of the liquid against the resistance of the solid material in counter-flow, and thus to extend the duration of the treatment, in such a manner that the best treatment time is obtained. For example, in a process for the extraction of juice from vegetable matter, such as sugar beet cossettes, an optimum ratio can be obtained between the quantity of juice which is extracted and the quantity of the material which is treated in a given unit of time. This ratio may be about 1.1:1 in the treatment of sugar beet cossettes.

However, with many materials which require to be treated, temporary variations occur in the quality of the material, which may have a considerable effect on the ease with which the liquid filters through the material. It is affected, for example, by variations in the size of the pieces into which the material has been cut, by variations in the biological nature of the material and by changes in the material which may be produced if it has been stored or frozen for a relatively long time. In such cases, the conditions which require an exact and uniform rate of liquid flow through the channel no longer exist. For example, if the individual batches of material offer a resistance to the flow of liquid which is less than normal an excessively rapid flow occurs, which results in the production of a juice which is too thin and which involves increased cost in concentrating it. Conversely, if the resistance of the batches of material to the liquid flow is too high the disadvantageous result is that the flow of liquid through the material is too small.

It is one of the objects of the present invention to provide an improved apparatus for the treatment of solid materials with liquids by means of which the speed with which the liquid passes through the material and the period during which it is in contact with the latter may be controlled.

The invention will now be more fully described by way of example, with reference to the accompanying drawings which show, purely diagrammatically, a number of forms of apparatus exemplifying the principles of the invention.

In the drawings:

Figure 7 is a diagrammatic sectional view showing another modification.

Figure 1:
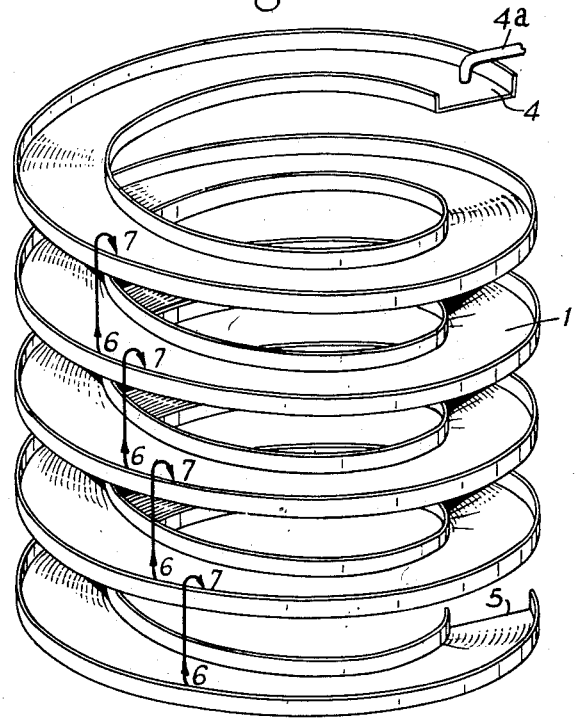
Figure 1 is a perspective view showing diagrammatically one form of lixivating apparatus according to the invention.
Figure 2:
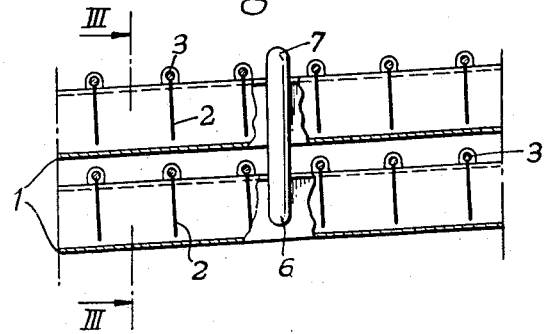
Figure 2 is a diagrammatic detail view showing in longitudinal section part of the apparatus of Figure 1.
Figure 3:
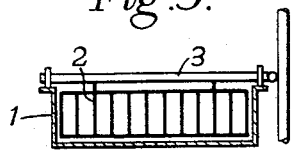
Figure 3 is a section taken on the line III—III of Figure 2.

Referring to Figures 1 to 3, the reference numerals indicate the following parts: 1 is a helical liquid channel through which the material undergoing treatment, which is subdivided into separate batches, is transported in an upward direction. This transporting action is effected, in this case, by rakes 2 which are fixed to linkage indicated diagrammatically at 3. The linkage 3 is in its turn connected to an endless conveyor belt which is not shown. The extraction liquid is fed into the channel 1 at its upper end 4 (for example through a pipe 4a) and the material to be treated is supplied to it at its lower end 5.

On the assumption that the downwardly-flowing liquid does not meet, in the upwardly moving material, a resistance sufficient for an optimum travel time down the channel to be produced, fractions of the liquid substantially devoid of the material are pumped back from positions 6 to higher position 7 in the channel. For the sake of simplicity, the pump means used for this purpose are not specifically shown in the drawings.

Figure 4:
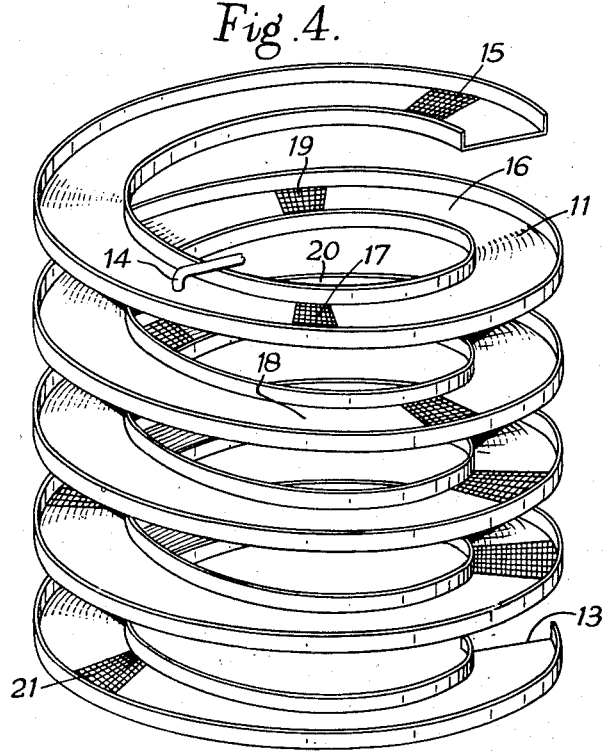
Figure 4 is a view similar to Figure 1 but showing a modified form of apparatus.
Figure 5:
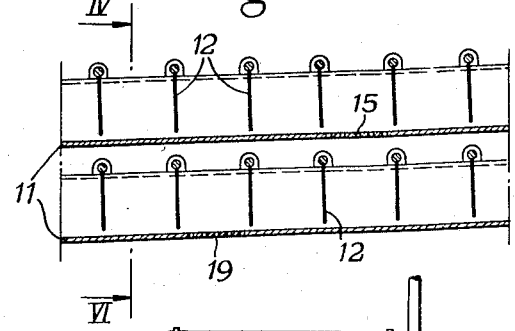
Figure 5 is a view, similar to Figure 2, of the apparatus shown in Figure 4.
Figure 6:
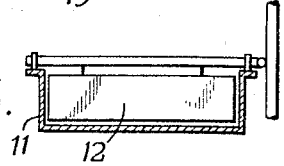
Figure 6 is a section taken on the line VI—VI of Figure 5.

Referring now to Figures 4 to 6, the reference numerals are as follows: 11 indicates the helical liquid channel up which the material being treated, divided into separate batches, is conveyed from the bottom to the top. Instead of the rakes 2, plates 12, which engage closely against the walls of the channel 11, are provided for effecting the transport of the material.

The supply to the channel 11 of the material to be extracted is effected at the lower end 13 thereof, while the extraction liquid is introduced into the channel at the point 14. From the latter point, the liquid is drawn up as far as the point 15 by the plates 12 which are serving simultaneously for conveying the material up the channel. At the point 15 a short section of the bottom of the channel is constructed in the form of a grid, so that the liquid drops straight downwardly by gravity without confinement from one channel portion to another and immediately underlying channel portion, while the treated cossettes are conveyed over the grid to the discharge point at the top of the channel. The drained liquid returns to the channel again at the point 16 at a lower level.

The process of entraining the liquid with the material being treated is then repeated as far as the point 17 and also the subsequent draining of the liquid to the point 18 at a lower level. From the point 18 the liquid is again carried upwardly as far as the point 19 whence it is returned to the point 20, and so on. In this manner, the liquid, when it has passed through all sections of the channel, finally reaches the bottom of the latter so that it leaves the channel through a grid at the point 21. In the arrangement shown in Figures 4 to 6, the spaced openings and grids are located in successive convolutions of the channel so as to deliver liquid into channel convolutions respectively below the successive convolutions in which the openings are located respectively. Consequently, throughout the upward helical travel of downwardly through the channel is delivered as liquid the solid material, liquid in addition to that flowing substantially devoid of solid material, into each convolution of the channel.

If provision is made for the plates 12 to engage closely against the walls of the channel 11, which can be effected, for example, by fitting rubber strips along the edges of the plates, a very accurate control of the liquid flow can be produced with the method which has been described, the period of such flow being determined by the conveying of the material through the apparatus and independently of the nature of the material being treated, the fineness of the material, the depth of the material in the channel and other factors.

It is obvious that the liquid flow may also be accelerated by having the plates 12 arranged so that they do not bear absolutely tightly against the walls of the channel, so that in addition to the drainage of the liquid into the separate sections through the grids in the channel, there is also produced a slow downward movement of small quantities of the liquid, depending on the slope of the channel and the permeability of the material in it.

Moreover, in accordance with the method which has been described, it is also possible to construct the apparatus in such manner that only one drainage point, instead of two, is provided in each turn of the helical channel and that all or some of the liquid is fed back into the same helical section of the channel in which it was carried upwardly by the movement of the material. Circulatory movements of the liquid are thereby set up in the separate sections, so that in accordance with the supply of fresh liquid into the upper part of the channel, equal quantities flow into the sections below at the separate liquid-drainage points, due to an overflow effect.

Figure 7 shows diagrammatically another possible arrangement, indicating how it is possible accurately to control the liquid discharge in an inclined channel. In this figure, the reference 21 represents a section of the inclined channel which, for the sake of simplicity, is shown as a straight channel but which, in its practical form, is preferably helically coiled, as shown in Figures 1 and 4. Moving in a direction opposite to the downward slope of this channel are wire baskets 22, 23, 24, 25, 26, 27, 28, etc., which are filled to the top with the material to be treated. In the present case, it is assumed, by way of example, that the baskets are all interconnected in pairs by balance beams 29 which are pivotally supported at 30. The operation of the apparatus is as follows:

During the slow transport of the baskets upwardly towards the right (this conveying movement may also take place intermittently), the basket 22 is raised and the basket 23 is lowered by means known per set. The liquid in the channel between the baskets 22 and 24, substantially devoid of the material, is thereby given an opportunity of flowing downwardly a further stage. A short time later, this process is repeated with the baskets 24 and 25, so that the liquid previously dammed between the baskets 24 and 26, substantially devoid of the material, is now trapped between the baskets 23 and 25, that is to say, it flows downwardly another stage. Thereafter, the mutual raising and lowering movements of the baskets 26 and 27 take place. Each time, therefore, there is produced an intermittent movement of the liquid towards the bottom of the channel, and at the same time, by reason of the upward conveying movement of the baskets along the channel, the subdivided quantities of liquid are each time carried a small distance in the upward direction again. For a given conveying speed, the rate of liquid discharge from the end of the channel is dependent upon the alternation between the lowering and raising of the baskets filled with material.

The apparatus according to the invention which has been described may be modified and constructed in many ways within the scope of the invention, as set forth in the appended claims. This relates more especially to the construction of the liquid channel and the type of conveying means which are provided for conveying the material along the channel.

I claim:

1. Apparatus for treating a material with a liquid comprising a continuously upwardly inclined channel having such shape that one portion of the length thereof overlies another portion of the length thereof, conveyor means for causing the material to travel continuously upwardly in the channel, means supplying the liquid to the upper part of the channel in order that it may flow downwardly in the channel through the material therein, and an opening in said one channel portion directly above said other channel portion for delivering liquid straight downwardly by gravity without confinement from said one channel portion to said other channel portion.

2. Apparatus for treating material with a liquid comprising a helical, vertical axis channel having a plurality of mutually superimposed convolutions; means for introducing the liquid into said channel adjacent the top thereof; conveyor means for transporting the material from the lower end of the channel helically along the channel and to the top thereof and for moving a portion of said liquid helically upwardly through the channel from lower portions thereof to upper portions thereof; and a plurality of spaced openings respectively in certain of said convolutions and vertically above immediately underlying convolutions for delivering liquid from said certain of said convolutions directly downwardly by gravity into said immediately underlying channel convolutions.

3. Apparatus as set forth in claim 2 in which each convolution of said channel below which there is another channel convolution is provided with an opening for delivering liquid into the channel convolution immediately below.

4. Apparatus as set forth in claim 2 including a grid in each of said openings.

5. Apparatus as set forth in claim 2 in which the conveyor means comprises a plurality of spaced plates extending transversely of the channel and fitting closely within the walls of the channel; and chain means for connecting and driving said plates.

References Cited in the file of this patent

UNITED STATES PATENTS 2,273,557    Bonotto _____ Feb. 17, 1942